United States Patent Office 3,463,511
Patented Aug. 26, 1969

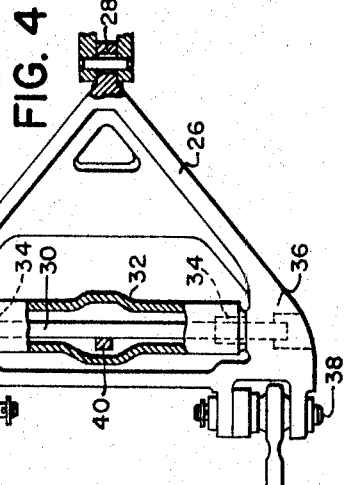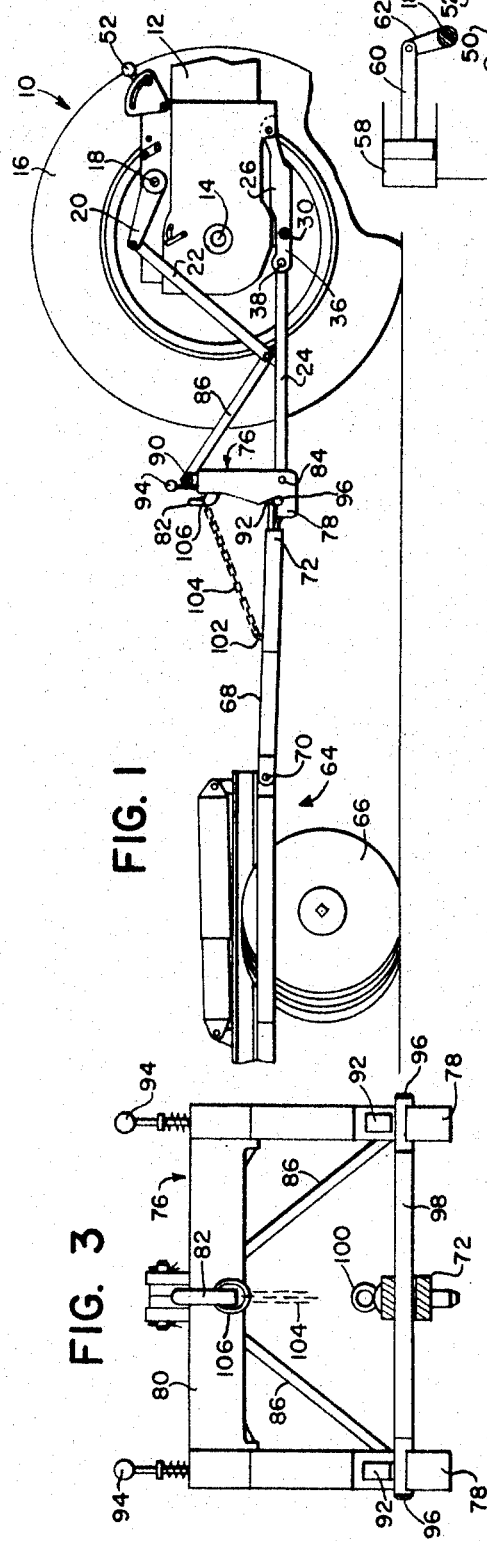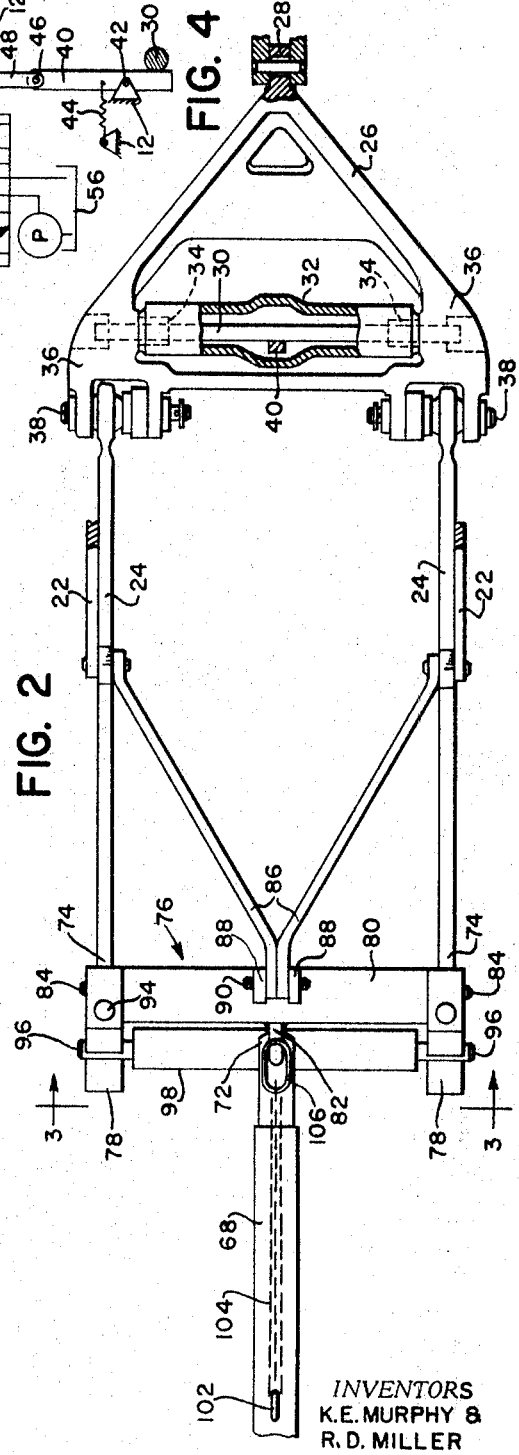

3,463,511
WEIGHT-TRANSFER HITCH
Kenneth Earl Murphy and Robert Deryl Miller, Cedar Falls, Iowa, assignors to Deere & Company, Moline, Ill., a corporation of Delaware
Filed Aug. 14, 1967, Ser. No. 660,353
Int. Cl. B60d *1/00;* B62d *53/00;* A01b *63/112*
U.S. Cl. 280—405                      9 Claims

ABSTRACT OF THE DISCLOSURE

A hitch coupler providing three hitch points on a tractor equipped with power operated vertically adjustable trailing draft links for connecting a trailing implement to the tractor in such manner as to enable the transfer of at least part of the weight of the implement to the tractor upon raising of the draft links.

BACKGROUND OF THE INVENTION

The invention relates to tractor-implement trains and more particularly to such relationship in which the implement is of the trailing type as distinguished from that mounted directly on the tractor.

It is known of course, from the so-called Ferguson draft control system and variations thereof, to adjust the vertical position of a tractor-mounted implement in response to changes in draft force, the general operation being based on variations in plowing depth, for example, so as to maintain a substantially constant draft force. Although the Ferguson and like systems involve a measure of weight transfer between the implement and tractor so as to vary the tractive ability of the tractor, the problems in trailing or drawn implements are somewhat different because little if any of the implement weight is initially borne by the tractor and vertical adjustment of the tractor draft links usually merely raises and lowers the implement tongue. Various efforts have been made to modify the hitch structure so as to obtain weight-transfer benefits in the field of tractor-drawn implements and vehicles, but none of these seem to have become commercially satisfactory, because of defects in design, application of incorrect principles and so forth.

SUMMARY OF THE INVENTION

According to the present invention, there is provided a simple coupler frame by means of which the conventional three-point hitch of a tractor may be easily and inexpensively converted to accommodate drawn implements and other vehicles by means of which the benefits of weight-transfer may be conveniently exploited, manually as well as automatically in response to variation in draft forces. The coupler frame features two lower hitch points connected to the draft links and an upper or third hitch point tensionally connected to a lift point on the implement tongue spaced rearwardly of the connection of the forward end of the tongue to a draft point between the lower ends of the coupler frame. The frame is braced in such a manner as to substantially preserve its upright position during raising and lowering of the draft links and so as to cause a lifting force to be exerted on the lift point of the tongue when the draft links are raised, thus transferring at least part of the weight of the implement to the tractor rear wheels. The coupler frame is of the type that may be readily used for other purposes and is therefore readily connectible to and disconnectible from both the tractor and implement.

BRIEF DESCRIPTION OF THE DRAWINGS

FIG. 1 is a side view, with portions broken away and other portions omitted, and illustrating one form of vehicle train to which the invention is applicable.

FIG. 2 is an enlarged view of an intermediate portion of the structure of FIG. 1, with certain portions broken away and other portions illustrated in section.

FIG. 3 is a rear view, partly in section, as seen substantially along the lines 3—3 of FIG. 2.

FIG. 4 is a schematic view showing a hydraulic control means typically employed with tractors of the type illustrated.

DESCRIPTION OF THE PREFERRED EMBODIMENT

The tractor, designated in its entirety by the numeral 10, may be of any conventional construction including a rear main body portion 12 having transverse rear axles 14, of which only one is shown, on which are mounted traction wheels 16, again only one being shown. The tractor has the usual transverse rock shaft 18 carrying external arms 20 from which lift links 22 depend for connection respectively to a pair of laterally spaced apart draft links 24.

Below the tractor body 12 is mounted a fore-and-aft shiftable support or A-frame 26, mounted at its forward end by any suitable sliding connection 28 and carried at its rear end by opposite ends of a transverse elongated bar 30 disposed crosswise of the length of the tractor and mounted in a depending body portion 32 in such manner that each end of the bar, short of its proximate terminal portion, is supported in the portion 32 by a fulcrum bearing 34. Thus, the extremities of the bar overhang the fulcra 34 and are mounted respectively in opposite lateral portions 36 of the A-frame 26. The bar 30 is resilient in bending and when normally straight, as when unloaded, assumes the position shown in FIG. 2, thus yieldingly opposing any rearward shifting of the A-frame 26 relative to the tractor body 12. It will be seen that when a rearward force is imposed on the draft frame 26, the rearward end portions, carried in the side parts 36 of the A-frame, will yield rearwardly, causing a center portion of the bar 30 to bow forwardly.

Draft forces are applied to the A-frame 26 by means of transversely coaxial pivotal connections 38 that connect the forward ends of the draft links 24 to the respective side parts 36 of the A-frame 26. This is known construction and further description is deemed to be unnecessary. An integral or directly-mounted implement would be mounted directly on the draft links 24 and stabilized by a top link so that draft forces transmitted from the tractor to the implement through the draft links 24 would cause variations in the amount of fore-and-aft shifting of the A-frame 26, thus causing different degrees of deflection or bowing of the central portion of the resilient bar 30. These forces are used to actuate control means for conventional power-operated means for turning the rock shaft 18 so as to cause changes in the vertical position of the implement as lifting and lowering forces, as the case may be, are applied to the draft links through the lift links 22.

A representative control means is illustrated schematically in FIG. 4, wherein the mid-portion of the bar 30 is shown as being engaged from the rear by an upright lever 40 pivoted intermediate its ends 42 on an appropriate portion of the tractor body 12. A tension spring 44 biases the lower end of the lever 40 into engagement with the mid-portion of the bar 30. The upper end of the lever 40 is pivotally connected at 46 to a second lever 48 which is pivoted at its other end to a link 50 which in turn extends forwardly and is pivotally connected to a typical manual control lever 52. The lever 48 is linked intermediate its ends to a typical valve 54 which controls the flow of hydraulic fluid among a pump P, a reservoir 56 and a hydraulic lift cylinder 58, from which a piston rod 60 extends forwardly for connection to an internal arm 62 rigid on the lift rock shaft 18. From the foregoing description, it will be seen that when a rearward force is exerted through the draft links 24 so as to shift the A-frame 26 rearwardly, the midportion of the transverse bar 30 bows forwardly, followed by the lower end of the lever 40, the upper end of which swings rearwardly to cause the upper lever 48 to shift the valve 54 to the left, thus connecting the pump P to the interior of the lift cylinder 58. Such operation would occur, for example, in response to an increased draft force because of soil conditions, for example, in the case of a plow or like tillage implement.

The trailing implement 64 is connected to the tractor in such manner that it initially transfers no weight to the tractor, being in this case carried by ground-engaging means, such as a plurality of discs 66 directly by the ground. In the case of a simple trailer, the ground-engaging means would of course be wheels. A fore-and aft draft tongue 68 is pivotally connected at its rear end at 70 to the front of the implement 64 and extends forwardly to a forward end 72 substantially at the level of and substantially centrally between the rear ends 74 of the draft links 24.

The invention features means for hitching the implement to the tractor and comprises a rigid coupler frame 76 having a pair of lower laterally spaced apart portions 78 that provide a pair of hitch points. The general attitude of the frame is substantially upright and it has a transverse upper portion 80 including a central portion in the form of a hook 82 that affords a third or upper hitch point. The lower parts of the coupler 76 are pivotally connected to the draft links 24 respectively at 84, and these pivots are coaxial on a transverse axis. In order to preserve the substantially upright condition of the coupler frame 76, brace means 86 are provided between the draft links 24 and the upper part of the coupler, the latter being provided with a pair of upstanding apertured ears 88 through which a pin 90 is removably inserted. The braces 86 substantially rigidify the coupler frame 76 as to its vertical position so as to cause it to move up and down with vertical movement of the draft links 24. Because of the triangulation among the draft links, braces and coupler frame, the coupler frame will swing about the pivot axis 38 as the structure is elevated and lowered. This improves the capacity of the mechanism, particularly relative to the sensitivity of the control means in response to the signal transmitted by the responder lever 40.

The lower parts 78 of the coupler are preferably in the form of hooks, each of which has a cooperative latch 92 controlled by a releasable operator 94 for receiving opposite ends 96 of a transverse draft bar 98 which is centrally apertured to receive a hitch pin 100 through the forward end 72 of the draft tongue 68. The latch operators 94 may be of any conventional construction and function, when depressed, to release the associated latches 92 for enabling disconnection of the draft member end 96. The relationship between each hook 78 and its latch 92 is such that the ends 96 of the transverse draft bar 98 are rockable about a transverse axis relative to the coupling frame 76.

Rearwardly of its forward end 72, the draft tongue 78 is provided with an eye 102 which establishes a lift point to which the rear end of a tension member 104 is connected. The upper or forward end of the tension member 104 has a ring 106 releasably engageable with the hook 82 at the upper end of the coupler frame. The tension member 104, here a chain, being flexible, is of course collapsible in compression.

In normal operation of the tractor-implement train, the transverse pivot axis established by the ends 96, 96 of the draft bar 98 provide for vertical articulation between the tractor and implement, and the hitch or clevis pin 100 provides for lateral articulation. As best seen in FIGS. 1 and 2, the axis of the clevis pin 100 is substantially coincidental with the vertical axis included in the connection of the chain ring 106 to the coupler frame hook 82 so that there is no interference between the two on turns.

When the tractor and implement are used in the usual harrowing operation, the depth of the discs into the soil, the condition of the soil and other factors will determine the amount of draft force transmitted by the tractor to the implement and this in turn determines the amount of deflection of the resilient bar 30. In conditions under which the tractor wheels 16 lose traction, an increase in draft force will be effective to operate through the control mechanism of FIG. 4 to cause the rock shaft 18 to turn in a clockwise direction, thereby elevating the draft links 24 and coupler frame 76. A lifting force will be applied through the tension means or chain 104 to the tongue 102, thereby lifting at least the forward end of the implement 64 and thereby transferring this much of the implement weight to the tractor, thus improving the tractive ability of the tractor. The manual control lever 52 may be used by the operator to apply this lifting force at will, or he may set the control lever at such position as to cause the lift mechanism to apply a lifting force to the implement just short of that required to lift the implement completely out of the ground. Because of the articulation provided in the hitch structure, the vehicle train operates suitably over varying ground contour.

The simplicity of the construction of the coupler frame 76 and its adaptability for releasable connection to both the tractor and implement enable it to be easily used in converting conventional three-point hitches for directly-carried implements to tractor-drawn implements.

We claim:

1. For a tractor and trailing implement wherein the tractor has a pair of vertically adjustable trailing lower draft links having laterally spaced apart rear ends providing a pair of lower hitch points and the implement has ground-engaging means supporting the weight thereof and further includes a rigid fore-and-aft draft tongue having a forward end substantially at the level of and centrally between the rear ends of the draft links, the improvement residing in means for hitching the implement to the tractor, comprising a rigid upright three-point coupler frame having a pair of lower ends spaced apart on the order of and pivotally connected respectively to the aforesaid hitch points on a crosswise axis and further having an upper portion spaced above said hitch points and providing a central upper hitch point, means connecting the forward end of the tongue to and centrally between the lower ends of the coupler frame for pivoting about both vertical and transverse axes, brace means connected between the coupler frame and the draft links to maintain the position of the coupler frame substantially upright during vertical adjustment of the draft links, and tension means connected between said upper hitch point and a lift point on the tongue spaced rearwardly from said forward end so that raising of the draft links exerts a lifting force on the implement via said lift point.

2. The invention defined in claim 1, in which the connection of the tension means to said upper hitch point includes a pivot generally on said vertical axis.

3. The invention defined in claim 1, in which the upper hitch point on the coupler frame includes a hook from which the tension means is detachable.

4. The invention defined in claim 1, in which the lower ends of the coupler frame respectively include releasable devices and the means connecting the forward end of the tongue to the coupler frame includes a rigid transverse member having opposite ends releasably received by said devices and rockable therein on said transverse axis, said member having a central portion connected to the forward end of the tongue on said vertical axis.

5. For a tractor and trailing implement wherein the tractor includes a draft control system having trailing lower draft link means rearwardly shiftable by tensional implement forces to cause the system to respond by vertically adjusting the link means and the implement has ground-engaging means supporting the weight thereof and including a rigid tongue draft-connected to the link means by means including a transverse pivot, the improvement comprising a generally upright member carried by the draft link means for vertical adjustment therewith and including an upper portion spaced above the draft link means, and tension means connected between said upper portion and a portion of the draft tongue rearwardly of said pivot for exerting a lifting force on the tongue as the draft link means is raised in response to operation of the draft control system.

6. The invention defined in claim 5, in which the tractor includes a support connected to the draft link means, the support is connected to the tractor by biasing means enabling limited rearward shifting of said support in response to tensional tractor-implement draft forces and the draft control system is responsive to said shifting of said support to operate the power means.

7. The invention defined in claim 5, in which the member is a three-point coupler having two lower points connected to the draft link means and a lower portion providing the pivotal draft connection to the tongue, said member upper portion providing the third point.

8. The invention defined in claim 5, in which the member is rigidly braced to the draft link means independently of the tractor.

9. The invention defined in claim 5, in which the draft-connecting means for the tongue also includes a vertical pivot and the connection of the tension means to said upper member portion includes a vertical pivot generally coaxial with said first-mentioned vertical pivot.

References Cited

UNITED STATES PATENTS

| | | | |
|---|---|---|---|
| 2,247,534 | 7/1941 | Schlegell | 172—7 |
| 2,673,092 | 3/1954 | Sutherland | 280—406 |
| 3,022,831 | 2/1962 | Hess | 172—7 |
| 3,341,224 | 9/1967 | Bultheel. | |
| 3,347,560 | 10/1967 | Hodges et al. | 172—7 X |

LEO FRIAGLIA, Primary Examiner

U.S. Cl. X.R.

172—7